(12) United States Patent
Flores et al.

(10) Patent No.: US 6,190,260 B1
(45) Date of Patent: Feb. 20, 2001

(54) TRIPOD UNIVERSAL JOINT AND METHOD OF ITS MANUFACTURE

(75) Inventors: Randy A. Flores, Saginaw; Ron M. Feinauer, Owosso; Richard Allen Devers, Linwood, all of MI (US)

(73) Assignee: Delphi Technologies, Incx., Troy, MI (US)

( * ) Notice: Under 35 U.S.C. 154(b), the term of this patent shall be extended for 0 days.

(21) Appl. No.: 09/306,364

(22) Filed: May 6, 1999

(51) Int. Cl.[7] .................................................. F16D 3/30
(52) U.S. Cl. .......................... 464/111; 469/124; 464/925
(58) Field of Search .................................. 464/106, 111, 464/112, 120, 122, 123, 124, 136, 905

(56) References Cited

U.S. PATENT DOCUMENTS

| | | | |
|---|---|---|---|
| 3,029,617 | * | 4/1962 | Marquis et al. ..................... 464/905 |
| 4,083,202 | * | 4/1978 | Westercamp .......................... 464/111 |
| 4,224,808 | * | 9/1980 | Gehrke ................................. 464/106 |
| 4,516,957 | * | 5/1985 | Chyz et al. .......................... 464/111 |
| 4,795,404 | * | 1/1989 | Sutton et al. ........................ 464/111 |
| 6,042,479 | * | 3/2000 | Hopson et al. ....................... 464/145 |

* cited by examiner

*Primary Examiner*—Lynne H. Browne
*Assistant Examiner*—Kenneth Thompson
(74) *Attorney, Agent, or Firm*—Edmund P. Anderson

(57) ABSTRACT

A tripot-type universal joint includes a drive shaft mounting a spider with three roller elements disposed in three corresponding guide channels of an outer drive housing. The housing is formed with a retention groove on an inner surface thereof in which a stamped metal retainer is disposed. The retainer includes stop portions which extend along the running surfaces of the guide channels for wedging engagement between the drive rollers and drive channels to limit the outward stroke of the inner drive member and prevent the removal of the rollers from the housing.

13 Claims, 4 Drawing Sheets

TRIPOD UNIVERSAL JOINT AND METHOD OF ITS MANUFACTURE

TECHNICAL FIELD

This invention relates generally to stroking universal joints and more particularly to the retaining system for releasable retention of the inner drive member within the outer drive housing of the joint assembly.

BACKGROUND OF THE INVENTION

U.S. Pat. No. 4,516,957 to Chyz et al discloses a tripot-type universal joint having a drive shaft and a spider splined to the shaft and carrying a set of three rollers disposed within axial channels of an outer drive housing and retained against removal by an annular spring retainer wire. The wire retainer is mounted within an internal retention groove in the housing. As one or more of the tripot rollers approach the open end of the guide channels, they contact the retaining spring and can cause it to deflect axially outwardly if severely loaded.

U.S. Pat. No. 4,083,202 to Westercamp and U.S. Pat. No. 4,795,404 to Sutton et al disclose stroking constant velocity universal joints in which the inner rollers are retained in the outer drive housing by an external can or sleeve crimped about the exterior of the drive housing and having an end flange extending across the end face of the open end of the housing and then turned inwardly projecting into the roller channels. The inwardly directed portions of the '404 joint assembly serve to align the can with the drive housing and prevent relative circumferential movement therebetween, but do not interfere per se with the travel of the rollers. Retention relies instead on radially inwardly extending contoured portions which, like the spring retainer, are confronted by the rollers and susceptible to axial outward flexing under extreme loading. The projecting portions of the outer can of the '202 joint assembly lie in the path of the rollers and wedge between the rollers and their channels to limit the outward stroke of the rollers toward the open end of the housing. The outer can configuration of the '202 retainer is required to close the radially open roller channels of the drive housing.

SUMMARY OF THE INVENTION

According to the invention, a stroking constant velocity universal joint assembly comprises an inner drive member having a plurality of circumferentially spaced rotatable drive elements, an outer drive housing disposed about the drive elements having an inner wall formed with a plurality of circumferentially spaced drive channels having drive element-engaging running surfaces extending axially of the housing to an open end thereof and guiding the drive elements for axial stroking movement relative to the housing. A retention groove is formed in the inner wall of the housing adjacent its open end and releasably mounts a retainer having stroke-limiting stop portions projecting along the running surfaces of the drive channels for wedging engagement between the drive elements and the running surfaces to maintain the drive elements within the housing.

A method is also provided for manufacturing such a stroking constant velocity joint assembly in which the rotatable drive elements of the inner drive member are retained within drive channels of an outer drive housing by installing a retainer within a retention groove formed in an inner wall of the housing having stroke-limiting stop portions which extend along running surfaces of the drive channels adjacent the open end of the housing for wedging engagement between the drive elements and the running surfaces to maintain the drive elements within the housing.

The present invention has the advantage of providing a simple yet effective retaining system for the rotatable drive elements. Mounting the retainer within an inner groove of the housing overcomes the cost and complexity of outer can-type retention systems. The stroke-limiting stop portions which extend along the drive channels are highly effective at withstanding extreme loading and precluding axial flexing of the retainer which, if extensive, could interfere with the boot seal normally provided about the open end of the housing. By wedging between the drive elements and running surfaces, the stop portions are compressed rather than deflecting axially outwardly under loading from the drive elements.

BRIEF DESCRIPTION OF THE DRAWINGS

Presently preferred embodiments of the invention are disclosed in the following description and in the accompanying drawings, wherein.

DETAILED DESCRIPTION OF THE DRAWINGS

Figure 1:
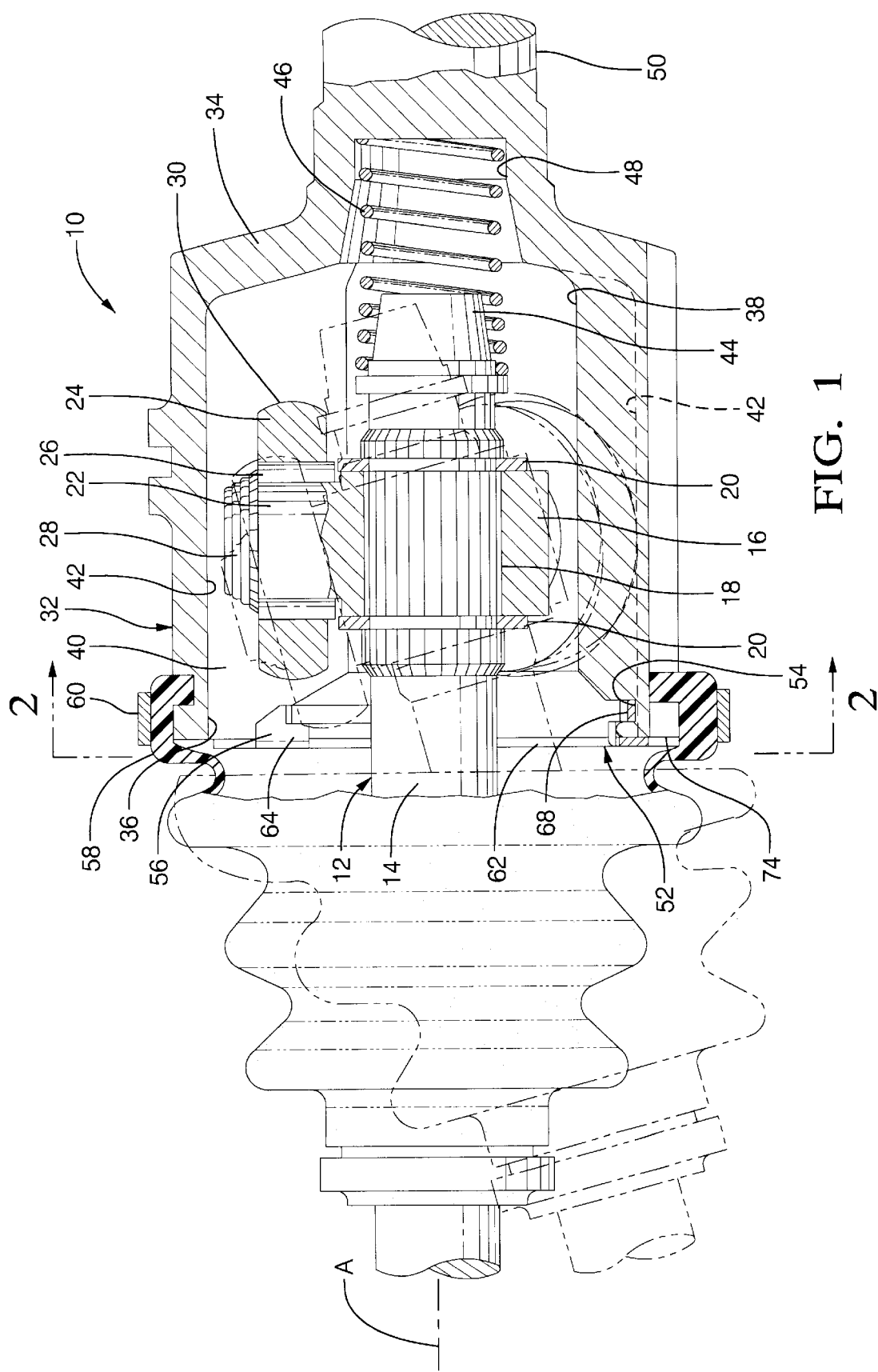
FIG. 1 is an elevational view of a universal joint assembly incorporating a retainer constructed according to a first presently preferred embodiment of the invention.
Figure 2:
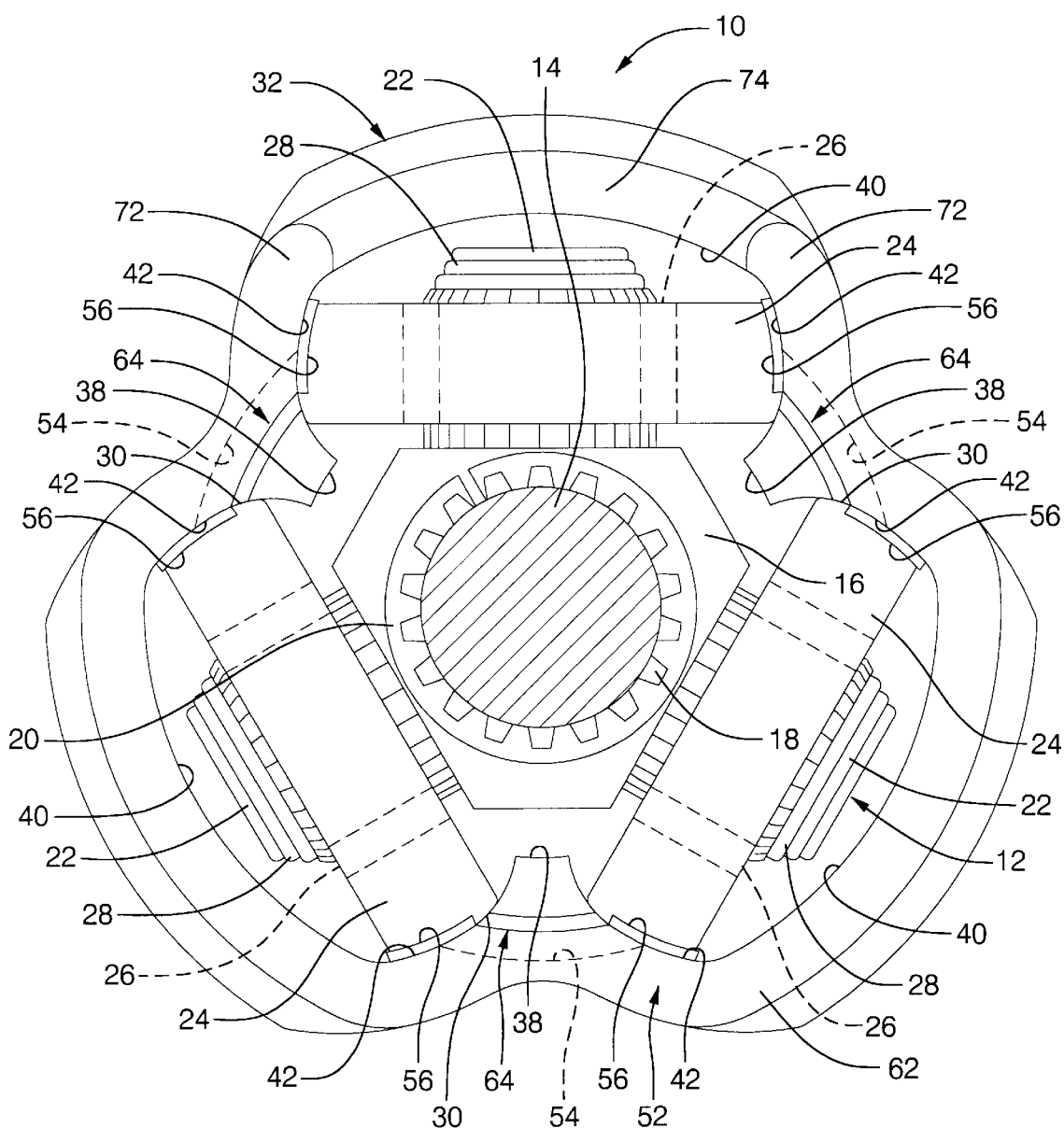
FIG. 2 is a sectional view taken generally along lines 2—2 of FIG. 1.
Figure 3:
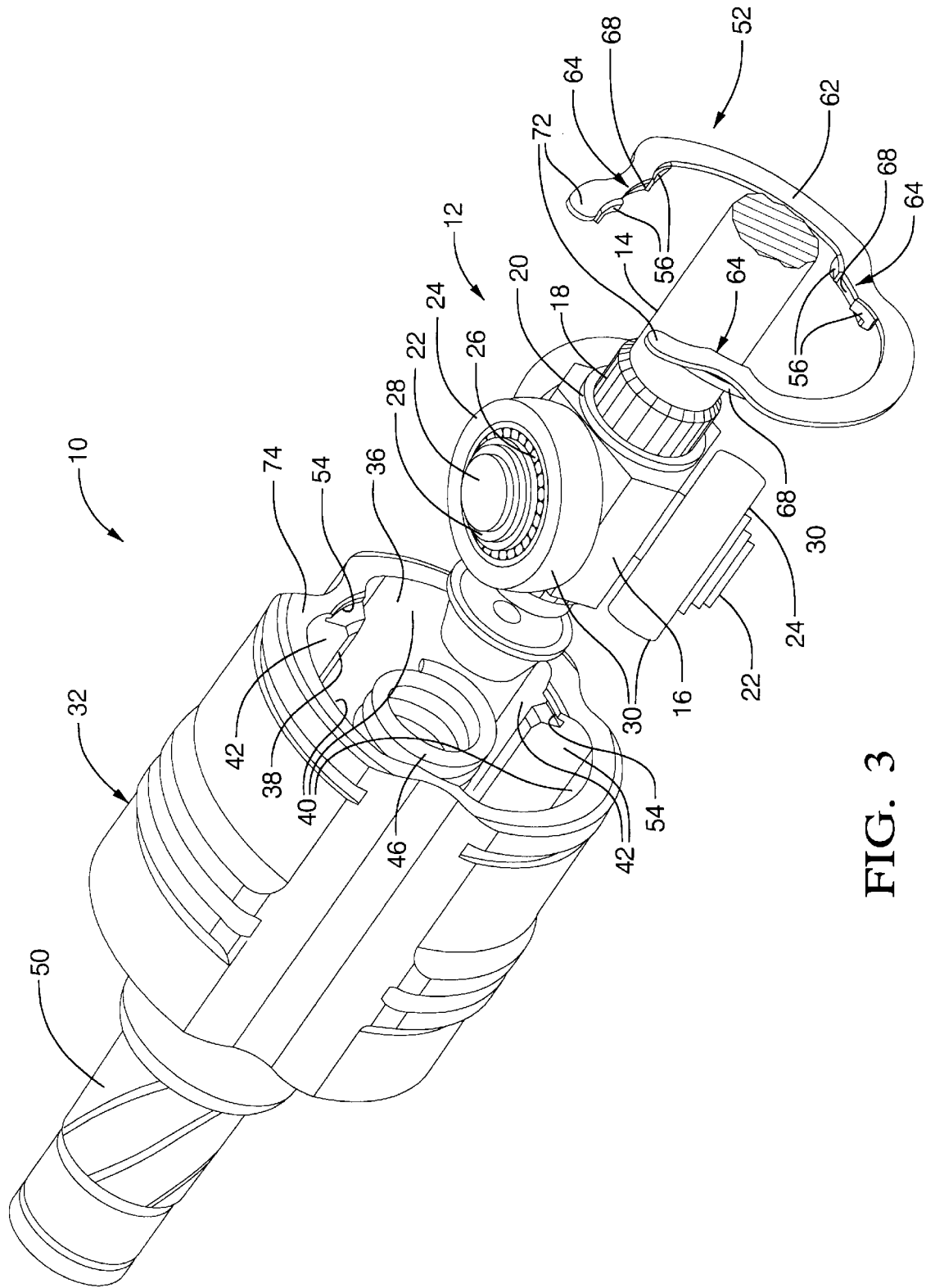
FIG. 3 is a fragmentary exploded isometric view of components of the universal joint illustrated in FIGS. 1 and 2.

Referring now in greater detail to the drawings, FIGS. 1–3 show a portion of a vehicle drive axle in the form of a stroking constant velocity universal joint assembly 10 of the tripot type having an inner drive member 12 comprising a drive shaft 14 and a drive spider 16. The drive spider 16 is secured to the end of the drive shaft 14 by cooperating splines 18 and axially opposed snap rings 20. The drive spider 16 has three equally circumferentially spaced radial trunnions 22 radiating from its central hub.

Three drive elements in the preferred form of rollers 24 are respectively mounted on the three trunnions 22 with full complements of needle bearings 26 interposed between the inner diameter of the rollers 24 and the outer cylindrical surface of the trunnions 22. The drive rollers 24 are thus both rotatable and slideable axially on the trunnions 22. Annular sheet metal retainers 28 are secured to the outer ends of the trunnions 22 to retain the needle bearings 26 and limit the radial outward movement of the associated drive rollers 24 with respect to their trunnions 22. Each of the three drive rollers 24 has a substantially part spherical drive surface 30 having a center substantially concentric with the radial axis of its associated trunnion 22.

The universal joint assembly 10 further includes an outer generally cylindrical drive housing 32. The housing 32 is closed at an inboard end by an end wall 34 and has an axially opposite open outer end 36. The housing 32 has an inner wall 38 formed with three circumferentially equal spaced drive channels 40 concentric with the longitudinal axis A of the housing 32 and extending longitudinally between the end wall 34 and the open end 36 of the housing 32. Each of the drive channels 40 includes a pair of radially extending circumferentially opposed concavely curved surfaces which form part spherical tracks or running surfaces 42 that engage the corresponding curved drive surfaces 30 of the associated drive rollers 24 to guide the inner drive member 12 with axial stroking movement within the housing 32 at all operating angles of the joint.

The innermost end of the shaft 14 is convexly curved and has a spring seat 44 slideably mounted thereon as shown in FIGS. 1 and 3 that fits within the end of helical centering spring 46. The other end of the spring 46 is seated in a spring pocket 48 formed in the end wall 34 of the housing 32.

The housing 32 includes a centralized external drive shaft 50 formed integrally with the end wall 34 and extending axially therefrom for driven connection with another component, such as a side gear of a differential (not shown).

To maintain the drive spider 16 and rollers 24 within the housing 32, a retainer 52 is provided which, according to the invention, is mounted within an inner annular segmented retention groove 54 machined or otherwise formed in the three coned or ramped segments of the inner wall 38 of the housing 32 that separate the three drive channels 40. The retainer 52 includes a plurality of stroke-limiting stop portions 56 that extend axially into the drive channels 40 from the open end 36 of the housing 32 and overlie and engage the running surfaces 42 in a position to wedge between the drive rollers 24 and the running surfaces 42 of the drive channels 40 in response to forces acting to withdraw the drive rollers 24 and drive spider 16 from the open end 36 of the housing 32. It will be appreciated that the wedging action exerts a radial binding force between the drive rollers 24 and the running surfaces 42 of the drive channels 40 by effectively reducing the radial width of the running surfaces 42 adjacent the open end 36. The radially directed wedging force greatly minimizes or altogether eliminates any axially outward flexing of the retainer 52 under load, assuring that there is no interference with the operation of a convoluted elastomeric boot seal 58 sealing the open end of the joint 10 and secured at its opposite ends by clamps 60 in the usual manner.

Figure 4:
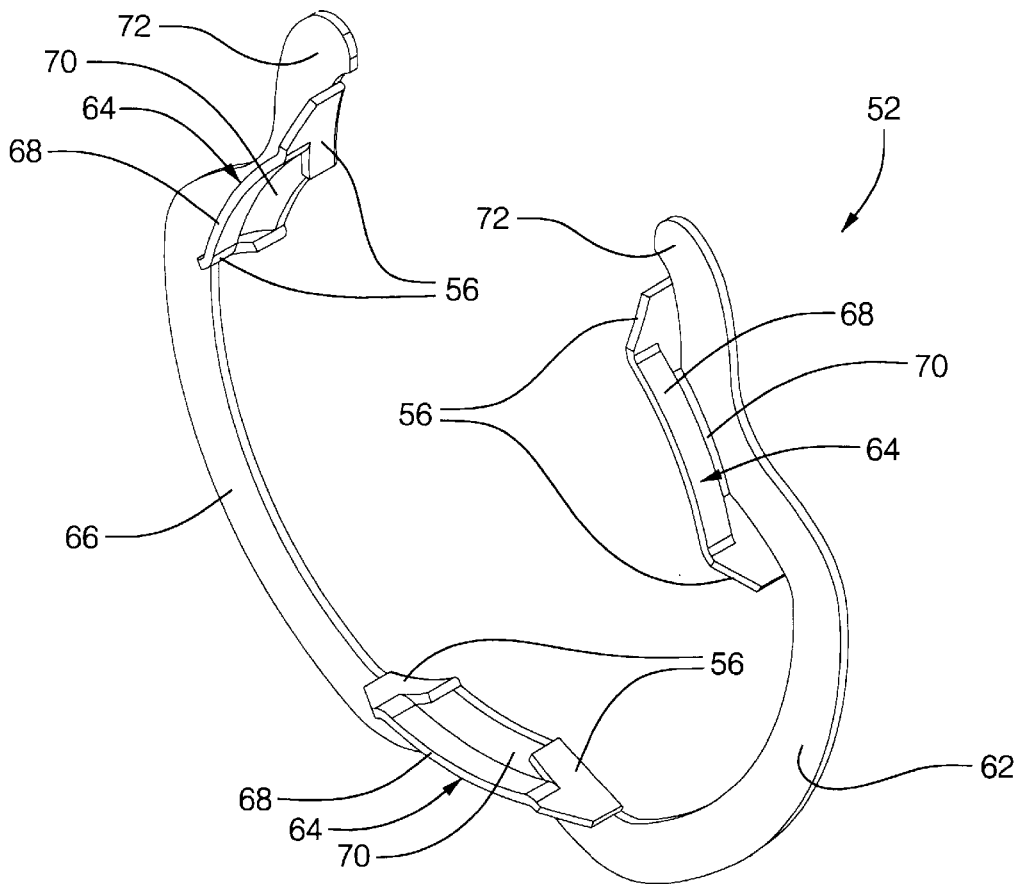
FIG. 4 is an enlarged isometric view of the retainer according to the first presently preferred embodiment.

According to the first embodiment and referring particularly to FIG. 4, the retainer 52 has a generally flat, planar retainer body 62 formed with a set of three tab formations or ears 64 that project transversely out of the plane of the retainer body 62 from one side 66 of the retainer body 62. The ears 64 of the first embodiment are formed with locking portions in the preferred form of spring straps 68 positioned to be received with a snap fit into the respective groove segments 54 of the housing 32. The ears 64 preferably include the stop portions 56 disposed on either side of the spring straps 68. Each ear 64 has a central cut-out region 70 isolating a web of material connected at its ends to the stop portions 56 arranged on circumferentially opposite sides thereof, the web being radially outwardly bowed and having a width corresponding generally to that of the retention groove 54 to define the spring straps 68. The stop portions 56 on either side of the spring straps 68 are angularly offset from one another and circumferentially spaced to nest with the angular running surfaces 42 of the adjacent drive channels 40.

The flat retainer body 62 preferably has an open ring configuration with circumferentially spaced free ends 72 that provide a certain amount of circumferential elastic resiliency to the rigid retainer body 40 to accommodate the installation of the spring straps 68 within the segmented retention groove 54. The retainer 52 is preferably formed from stamped sheet metal stock of low carbon commercial grade steel, such as SAE 1010, with the ears 64 and cut-outs 70 being formed in the initial stamping operating and subsequently the spring straps 68 are bowed out of the plane of the ears 64 and the ears bent out of the plane of the retainer body 62 in one or most post-stamping forming operations. Alternatively, the retainer 52 could be formed of other rigid elastically resilient materials, such as any of a number of molded or stamped and formed plastics materials.

To assemble the joint components, the inner drive member 12 is extended into the open end 36 of the housing 32 to position the drive rollers 24 within the drive channels 40. The retainer 52 is oriented as shown in FIG. 3 with the ears 64 facing the housing 32 and the retainer 52 positioned about the shaft 14 by passing the shaft 14 between the free end 72 of the retainer body 62, it being understood that the free ends 72 are spaced sufficiently to enable the retainer 52 to be piloted about the shaft from the side through the opening between the free ends 72. To assemble the retainer 52 with the housing 32, an inward pinching or closing force is applied to the free ends 72 either by hand or with the assistance of a tool to constrict the effective diameter of the retainer body 62 sufficiently to enable the outwardly bowed spring straps 68 to be guided into the open end 36 of the housing 32 in line with the segmented retention groove 54. Once positioned, the free ends 72 are released, causing the retainer body 62 to return elastically outwardly, thereby disposing and maintaining the spring straps 68 securely but releasably within the retention groove 54. It will be appreciated that the retainer 52 cannot be assembled with the housing 32 in the reverse direction with the retainer 52 oriented with the ears 64 facing away from the housing 32.

It will be seen from FIGS. 1 and 2 and appreciated from FIG. 3 that the retainer body 62 is dimensioned to remain external to the drive housing 32, and preferably conforms in size and shape to an outer end face 74 of the housing 32 adjacent the open end 36. As such, only the ears 64 extend into the housing 32. Such increases the stroke length or travel of the inner drive member 12 within the housing 32 as compared to a conventional spring wire retainer. Locating the spring straps 68 in the retention groove 54 in turn seats the stop portions 56 in contact with the outer end portion of the running surfaces 42 of the drive channels 40, preventing the removal of the drive member through the wedging action of the stop portions 56 described previously.

Figure 5:
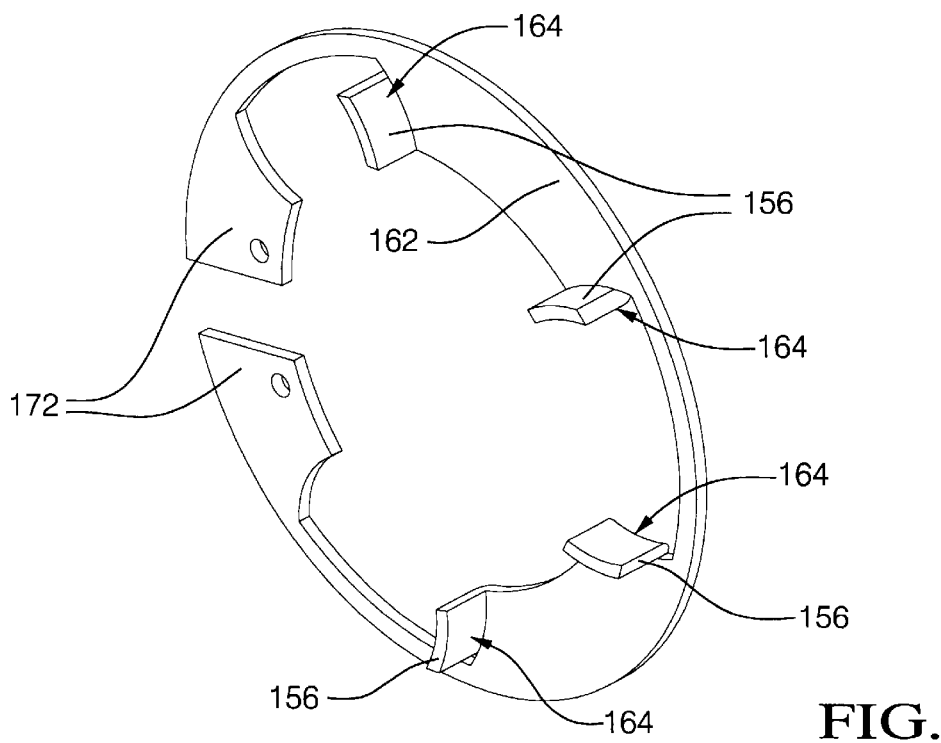
FIG. 5 is a similar isometric view of a retainer constructed according to a second presently preferred embodiment of the invention.

FIG. 5 illustrates a retainer 152 constructed according to an alternative embodiment of the invention that can be used in place of the retainer 52 of the first embodiment to achieve the same objectives. Corresponding features of the retainer 152 of the second embodiment are identified by the same reference numerals as those used with regard to the retainer 52 of the first embodiment, but are offset by 100. The retainer 152 includes a similar open ring retainer body 162 that is flat and planar and is formed with stop portions 156 that project out of the plane of the retainer body 162 in overlying contact with the running surfaces 42 of the drive channels 40 of the housing 32 to achieve the same wedging effect for retaining the inner drive member 12 within the housing 32. The retainer 152 differs in that the body 162 is disposed in the segmented retention groove 154, supporting the stop portions 156 in engagement with the drive channel running surfaces 142. The installation is similar in that the open retainer body 62 is guided from the side above the shaft 14 and compressed by pinching the free ends 72 toward one another sufficiently to enable the retainer body 62 to be extended into the housing 32 in line with the groove 54, after which the compression force is released enabling the retainer to spring outwardly into secure but releasable engagement within the groove 54.

The disclosed embodiments are representative of presently preferred forms of the invention, but are intended to be illustrative rather than definitive thereof The invention is defined in the claims.

What is claimed is:

1. A stroking constant velocity universal joint assembly comprising:

an inner drive member having a plurality of circumferentially spaced rotatable drive elements;

an outer drive housing disposed about said drive elements having an inner wall formed with a plurality of circumferentially spaced drive channels having running surfaces extending axially of said housing to an open end thereof and guiding said rotatable drive elements for stroking movement within said outer drive housing;

a retention groove formed in said inner wall of said housing adjacent said open end thereof; and a retainer releasably mounted in said groove having stroke-limiting stop portions projecting along said running surfaces for wedging engagement between said drive elements and said running surfaces of said drive channels to maintain said drive elements within said housing.

2. The assembly of claim 1 wherein said retainer includes a generally flat, planar retainer body having an open ring configuration with free ends and a plurality of ears tab formations projecting into said drive channels with stop portions lying along said running surfaces of said drive channels.

3. The assembly of claim 2 wherein said retainer comprises a stamped metal member having said tab portions bent out of the plane of said retainer body.

4. The assembly of claim 2 wherein said ears include locking portions seated in said groove.

5. The assembly of claim 4 wherein said retainer body is disposed externally of said housing in mating engagement with an end face of said housing adjacent said open end.

6. The assembly of claim 4 wherein said locking portions comprise arcuate spring straps projecting outwardly of said ears and received in said retention groove.

7. The assembly of claim 2 wherein said tab formations project from a first side of said retainer body allowing for one way installation of said retainer with said housing when said retainer is oriented with said tab formations projecting toward said housing and precluding installation when said retainer is reversely oriented with said tab formations projecting away from said housing.

8. The assembly of claim 2 wherein said retainer body is seated in said groove supporting said ears within said drive channels.

9. A constant velocity universal joint assembly comprising:

an inner drive member including a shaft and a spider mounted on said shaft carrying a plurality of circumferentially spaced drive elements rotatable relative to said spider;

an outer drive housing disposed about said spider and said drive elements including an inner wall formed with a plurality of circumferentially spaced drive channels having running surfaces extending axially of said housing to an open end thereof guiding said rotatable drive elements with stroking movement relative to said outer drive housing;

a retainer groove formed in said inner wall of said housing adjacent said open end thereof; and a retainer having a generally flat, planar body portion of an open ring configuration with spaced free ends formed with a plurality of ears projecting out of the plane of said body portion, said ears extending into said housing from said open end thereof, said ears having locking portions engaging said groove and securing said retainer releasably on said housing and stroke-limiting stop portions seated in overlying engagement with said running surfaces for wedging engagement between said drive elements and said running surfaces to maintain said drive elements within said housing.

10. The assembly of claim 9 wherein said retainer comprises a stamped metal member.

11. A method of making a stroking constant velocity universal joint assembly, comprising:

preparing an inner drive member having a plurality of circumferentially spaced rotatable drive elements;

preparing an outer drive housing having an inner wall formed with a plurality of circumferentially spaced drive channels formed with running surfaces extending axially of the housing to an open end thereof;

forming a retention groove in the inner wall of the housing adjacent the open end;

extending the drive elements of the inner drive member into the housing with the drive elements guided by the running surfaces of the drive channels for stroking movement of the inner drive member therealong relative to the outer housing;

preparing a retainer having a retainer body and stroke-limiting stop portions extending from the body;

securing the retainer releasably in the retention groove and seating the stop portions in overlying relation to the running surfaces in the path of the drive elements in such position for wedging engagement of the stop portions between the drive elements and the running surfaces to maintain the drive elements within the housing.

12. The method of claim 11 including forming the retainer to include a retainer body with a generally flat, planar, open ring configuration having a plurality of ears projecting out of the plane of the retainer body formed with the stop portions and locking portions, and seating the locking portions in the groove to secure the retainer releasably on the housing.

13. The method of claim 12 including mounting the retainer body externally of the housing such that only the ears project into the housing through the open end.

* * * * *